United States Patent Office 3,048,338
Patented Aug. 7, 1962

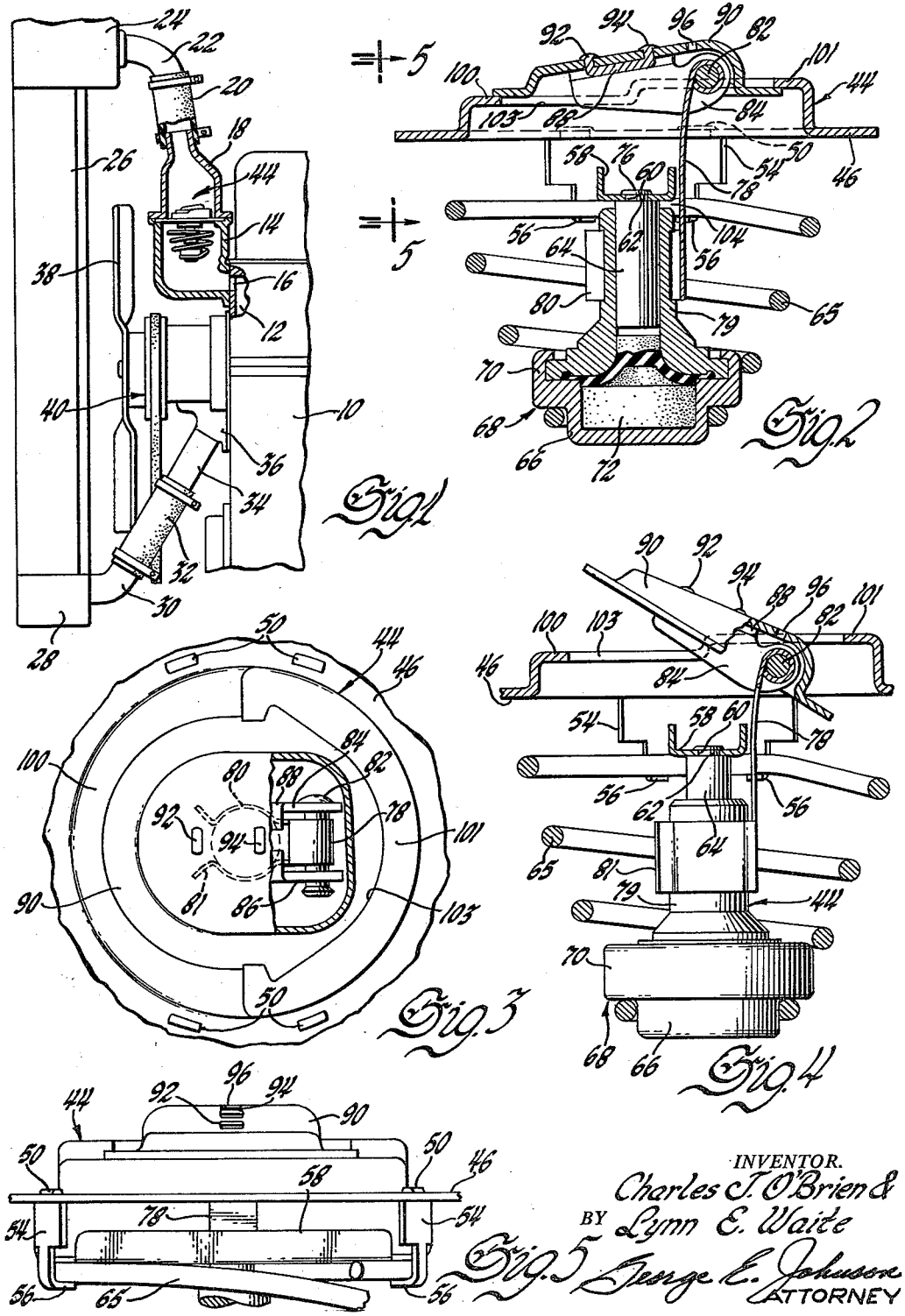

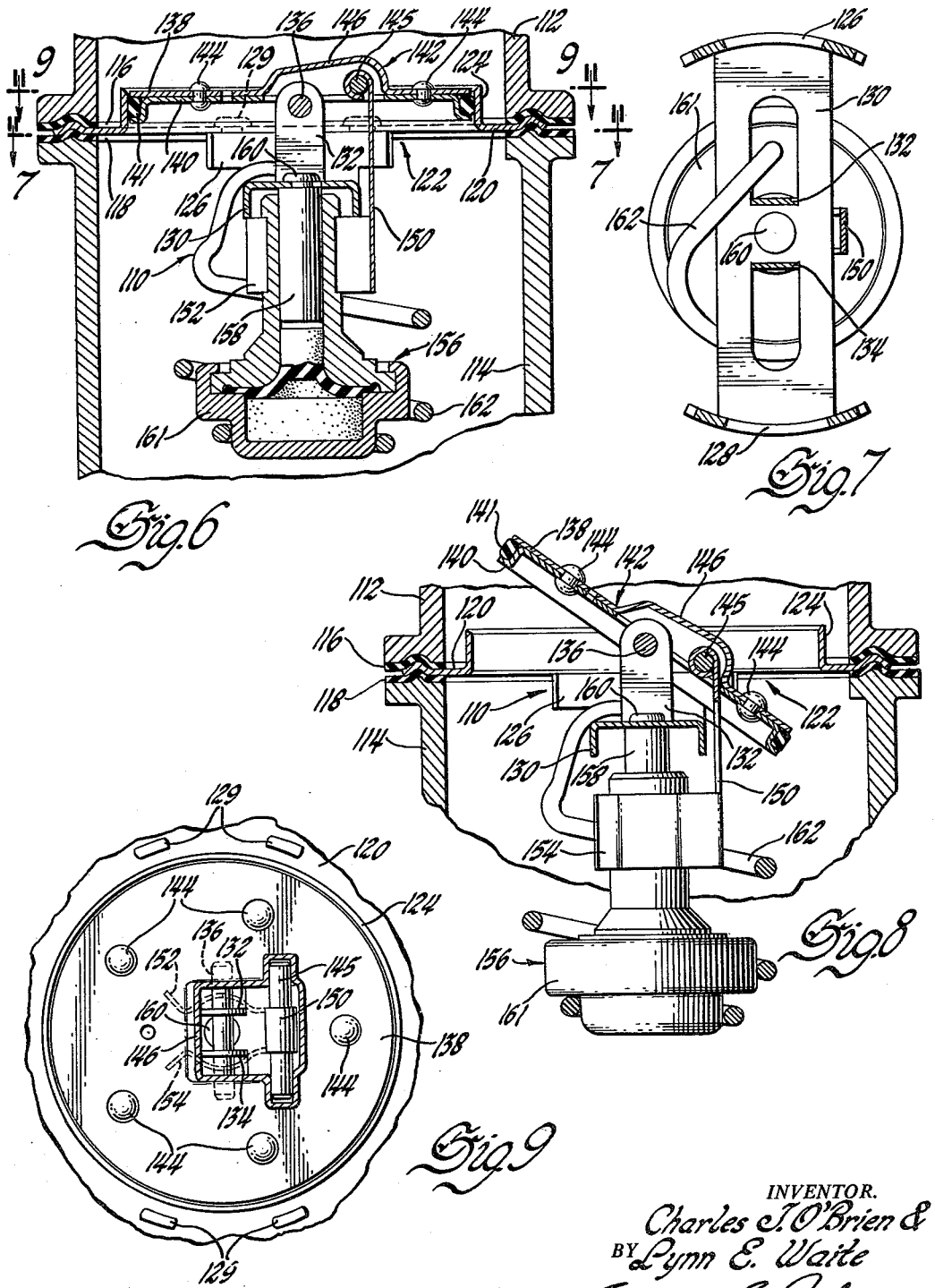

3,048,338
THERMOSTATIC VALVE STRUCTURES
Charles J. O'Brien, Lockport, and Lynn E. Waite, Gasport, N.Y., assignors to General Motors Corporation, Detroit, Mich., a corporation of Delaware
Filed July 22, 1959, Ser. No. 828,894
10 Claims. (Cl. 236—34)

This invention relates to valves and more particularly to thermostatically operated valve structures such as employed in controlling the flow of coolant fluid through automobile engine cooling systems.

Pellet motor operated thermostatic valve structures have been employed in engine cooling systems with considerable success. These valve structures are made by the thousands and it is obvious that any saving that can be made in their construction would be of great advantage. This saving, of course, should be realized without adversely affecting the functional characteristics of the structure or their durability in rugged service. Such structures are exemplified in the United States Patent 2,815,916, granted December 10, 1957, in the names of Holmes, Reynolds and Schwarz. The problem of simplifying and reducing the cost of these units is difficult as extremely slight variations in structure must be considered in respect to operational effect as well as in the light of the extensive commercial interest involved.

One object of the present invention is to provide an improved thermostatically operated valve structure of simplified construction and of nominal cost. Another object of the invention is to provide an improved thermostatically operated valve structure of the preferred butterfly type and which is rugged in service.

A feature of the present invention is a thermostatic valve structure in which a motion transmitting part of a pellet motor is supported on a valve frame by spring means. Another feature of the invention is a butterfly type valve structure utilizing a thermostatically operated pellet motor for actuating the valve, one of the operational parts of the motor being resiliently supported. Another feature is a pellet motor operated valve provided with coil spring means expandable by action of the motor when heated to open the valve, the axes of the motor parts being angularly fixed with respect to a frame upon which the valve is mounted.

These and other important features of the invention will now be described in detail in the specification and then pointed out more particularly in the appended claims.

In the drawings:

FIGURE 1 is a fragmentary side elevational view of the front end of an internal combustion engine showing a portion of the engine cooling system including a thermostatic valve structure comprising one embodiment of the present invention, certain parts of the system and the valve structure being broken away and shown in section more clearly to illustrate the operational relationship in a system and a form of installation of the valve structure;

FIGURE 2 is an enlarged sectional view of a thermostatically operated valve structure as shown in FIGURE 1, the valve being shown in its closed position;

FIGURE 3 is a plan view of the valve shown in FIGURE 2, a portion being broken away better to show some features of construction;

FIGURE 4 is a sectional view of the valve structure shown in FIGURES 1 to 3, inclusive, the valve being in an open position and a pellet motor forming a part of the structure being drawn in elevation;

FIGURE 5 is a view of part of the valve structure shown in FIGURE 2 looking in the direction of the arrows 5—5;

FIGURE 6 is an enlarged sectional view of a second form of a thermostatic valve structure as installed in a flow line adaptable for conducting coolant from an engine block to a radiator, the valve being closed;

FIGURE 7 is a sectional view looking in the direction of the arrows 7—7 in FIGURE 6, the duct structure being omitted;

FIGURE 8 is much like FIGURE 6 but with the pellet motor being shown in full and the valve being illustrated in its open position; and FIGURE 9 is a sectional view looking in the direction of the arrows 9—9 in FIGURE 6, the ducts being omitted.

In FIGURE 1 of the drawings, the reference 10 pertains to an internal combustion engine of a vehicle having a liquid cooled jacket 12. A fitting 14 is attached to the front end of the engine 10 and communicates with the jacket 12 through an opening 16 provided in the engine wall. A second fitting 18 is secured by bolts (not shown) to the fitting 14 and the upper end of the fitting 18 is connected by a conventional hose 20 to an inlet connection 22 leading to the upper tank 24 of a radiator core 26. The radiator may be of any suitable construction and is illustrated as embodying not only the upper tank 24 but also a lower tank 28. An outlet fitting 30 is arranged to communicate with the tank 28 and it is connected by a hose 32 to an inlet connection 34 leading to a pump 36 mounted at the front of the engine 10. A conventional fan 38 is driven from the crankshaft of the engine by a belt-and-pulley mechanism 40. It will be understood that when the engine 10 is normally operated, heated liquid from the jacket 12 will circulate through the hose 20 and the fitting 22 to the upper tank 24. This coolant passes downwardly through the core 26 to the tank 28 and is returned by fitting 30, the hose connection 32 and the fitting 34 as well as the pump 36 to the jacket 12 for recirculation as is conventional.

Interposed between the fittings 14 and 18 is a thermostatic valve structure generally indicated at 44 and to which the present invention applies. This valve structure constitutes a frame or valve seat member having a substantially circular flange 46 which is adapted to be held in clamped position between the fittings 14 and 18. The flange 46 bears two spaced and elongated perforations in each of two diametrically opposed areas to accommodate upstanding tabs 50 of a sub-frame. This subframe is held firmly to the flange 46 by upsetting the ends of the tabs 50 extending above the flange. The subframe has two diametrically opposed arcuate portions 54 each of which has two top upstanding tabs 50 heretofore mentioned and two bottom inwardly bent tabs 56. The two arcuate portions 54 of the subframe are joined by a bridge member 58 integral with the side portions. This bridge member is U-shaped in cross section to lend rigidity and is apertured as at 60 for the reception of a reduced portion 62 of a plunger 64. The tabs 56 are bent over to cooperate with the bridge member 58 tightly to retain the upper end or largest coil of a spiral spring 65. The latter is helical in configuration when expanded in the assembly with its upper and largest coil clamped to the valve frame as indicated. The lowest or smallest loop of the spring 65 is caused to encompass the reduced portion 66 of one part or casing 70 of a pellet motor indicated generally at 68. This motor is of the type disclosed in the Patent 2,815,916 herein referred to. This motor involves the plunger 64 which constitutes a motor part which may be expelled relative to the casing 70 by the expansion upon heating of a thermo-sensitive crystalline wax or the equivalent as indicated at 72. This material being enclosed within the motor is adapted to expand with considerable force applied against the lower end of the plunger 64 which is axially slidable in the motor housing. With this arrangement of the parts to form a valve structure unit, the plunger 64, the spring 65 and the motor casing 70 have their axes in alignment at all times and angularly fixed with respect to the valve structure frame.

A leaf spring or flexible stainless steel spring member 78 is attached to an upwardly extending neck 79 of the motor casing 70 by means of spring clip arms 80 and 81 integral with the member 78. The upper end of the strip 78 is looped rotatively to be held upon a short rivet or pivot pin 82 which in turn is held in two ears 84 and 86. These two ears are integral with a cross member 88 which in turn is fastened to a valve 90 as at 92 and 94. The valve 90 bears a small orifice 96 and also is so made as to form an over-and-under overlap of off-set valve seat portions 100 and 101 which are integral with the flange 46 of the frame. These seat portions define a valve port 103. Valve member 90 is notched at its periphery for pivotal action with respect to the off-set portions in the manner as suggested in the Patent 2,815,916 above mentioned and also as described in the U.S. Patent 2,815,924 granted December 10, 1957 in the name of Lewis D. Burch.

It will be noted that the pivot pin 82 is so located with respect to the axis of movement of the valve 90 that the spring member 78 will hold the valve in its closed position, as in FIG. 2, when the pellet motor 68 is cold. Under such conditions, the wax 72 is contracted and the motor casing 70 is held in its uppermost position by the tension in the helical spring 65. A slight clearance 104 (FIG. 2) is provided between the top of the motor housing or neck 79 and the bridge member 58 to ensure seating of the valve 90 by action of the spring 65.

As the coolant in the engine jacket 16 becomes heated, the wax 72 expands and serves to force the casing 70 downwardly, the reaction being against the bottom of the fixed plunger 64. The spring 65 yields accordingly and a downward pull is exerted by the spring member 78. This opens the valve 90 by pivoting the latter into an open position such as depicted in FIGURE 4. Coolant flow through the radiator is then established for normal operation of the engine 10.

It will be noted that pivotal movement of the valve 90 is accompanied by an arcuate movement of the pin 82 and a straight line movement of the motor casing 70. This is possible by virtue of the resilient construction of the spring member or connector 78 which bends but is of sufficient stiffness to ensure closure of the valve when the casing 70 moves upwardly.

A second embodiment of the invention is illustrated in FIGURES 6 to 9 inclusive. In FIGURE 6 a thermostatic valve structure generally indicated at 110 is installed in a duct system comprising two conduits 112 and 114. These conduits are provided with attaching flanges and interposed between the flanges are located sealing washers 116 and 118 as well as the peripheral flange 120 of a frame generally indicated at 122. This frame constitutes a cylindrical wall portion 124 integral with the flange 120 and two diametrically interposed and depending arcuate portions 126 and 128 fixed to the flange 120 at 129. These portions are joined by a horizontal bridge member 130. Two upwardly extending tongues 132 and 134 are cut from the sheet metal of the bridge member 130. These tongues serve to support a pivot pin 136. The ends of the latter are journalled between two plates 138 and 140 forming parts of a valve generally indicated at 142. The plates 138 and 140 are riveted together at five points 144 and cooperate at their peripheries to retain a sealing member in the form of an O-ring 141. This ring is so proportioned as to form a seal with the inner side of the cylindrical wall 124 and to form a tight closure when the valve 142 is placed in its closed position. A pin 145 has its ends retained between the two plates 138 and 140 so that it traverses a recess in a raised portion 146 of the plate 138. This raised portion is of sufficient dimensions not only to include the intermediate portion of the pin 145 but also to clear the upper curved ends of the tongues 132 and 134 as well as that portion of a leaf spring 150 which is rotatably fixed at one end to the pin 145. As in the case of the leaf spring 78 of FIGURES 1 to 5, inclusive, the leaf spring 150 has arms 152 and 154 integral with it for attachment to the casing of a pellet type motor 156 similar to the motor 68. In the present instance the upper end of the plunger 158 is rigidly fixed as at 160 to the central portion of the bridge member 130. The casing 161 of the motor is urged upwardly towards the frame 122 by a coil spring 162. The lowest coil of the spring retains the lower portion of the motor casing and the upper end of the spring is bent over the top of the bridge member 130 with the extreme end extending into one opening in the latter.

The valve structure of FIGURES 6 to 9 operates in the same manner as the valve structure of FIGURES 1 to 5 except that the valve 142 is free to swing or rotate without in the frame port as the only stop for limiting the movement of the valve during closure is the possible engagement of the movable motor casing with the underside of the bridge member 130. It is to be noted also that the coil spring 162 acts directly between the bridge member and the motor casing instead of from the side portions of the frame as is the case in the structure of FIGURES 1 to 5.

We claim:

1. A thermostatic valve structure including a frame with a valve seat defining a port, a valve movably supported on said frame for controlling said port, a bridge member rigidly joined to said frame and having a portion traverse of the axis of said port, a thermosensitive motor having two relatively movable parts with fixed axes conforming with the axis of said port, one of said parts being immovable with respect to said frame and fixed to said bridge member portion, said bridge member portion being interposed between a substantial portion of said motor and said valve, means connecting the other of said motor parts to said valve whereby motion may be translated to the latter, and spring means urging said other motor part toward said port.

2. A thermostatic valve structure including a frame with a valve seat defining a port, a valve movably supported on said frame for controlling said port, a thermosensitive motor having two relatively movable parts, a portion of said frame extending to the axis of said port and being interposed between said port and motor, one of said motor parts being connected to said frame by spring means under tension, and means connecting the other of said motor parts to said valve to operate the latter.

3. A thermostatic valve structure including a frame defining a port, a valve arranged to control said port, a thermosensitive pellet type motor having two relatively movable telescopic parts, a portion of said frame bridging said port, one of said telescopic motor parts being joined at one end to said bridge portion and having its major length extending from said bridge portion in a direction away from said port, the other of said motor parts being spaced from said frame, spring means yieldingly connecting the other of said motor parts to said frame, and means connecting said other motor part to said valve to impart motion to the latter when said motor is subjected to a change in temperature.

4. A thermostatic valve structure including a frame defining a port, a valve arranged to control said port, a thermosensitive pellet type motor having two relatively movable and telescopic parts with their major lengths extending away from said frame, one of said motor parts being fixed at one end to said frame, resilient means connecting the other of said motor parts to said frame urging said other motor part and frame toward each other, and means connecting the said other motor part to said valve to impart opening and closing movements to the latter when said motor is subjected to changes in temperature.

5. A thermostatic valve structure including a frame defining a port, a valve pivotally supported on said frame for controlling said port, a pellet motor having two relatively movable parts with their axes in permanent fixed angular relation to said frame, one of said parts being axially immovable and the other being slidable with respect to said frame, a spring member connecting the other of said parts to said valve for translating motion thereto, and coil spring means under tension and urging said other part toward said port.

6. A thermostatic valve structure as set forth in claim 5 in which said coil spring means is provided with a large loop at one end fixed to said frame and a small loop at its other end, and said other part being retained by said small loop.

7. A thermostatic valve structure as set forth in claim 5, said frame including a bridge member traversing said port and to which said one motor part is fixed, one end of said coil spring means acting against said bridge member, and the other end of said coil spring means acting against said other part.

8. A thermostatic valve structure including a frame defining a port, a valve pivoted along a given line to said frame for controlling said port, a temperature-sensitive pellet motor having two relatively movable parts comprising a plunger and a casing enclosing a substantial portion of said plunger, said plunger being rigidly fixed at one end to said frame, the axes of said plunger and casing extending through said port, coil spring means urging said motor casing toward said port, and a leaf spring connecting said casing with said valve at a point spaced from said line whereby a linear movement of said casing arising by a variation in temperature may impart a rotational movement to said valve.

9. A thremostatic valve structure as set forth in claim 8 in which the axes of the plunger and the casing are permanently fixed as to angularity with respect to the frame.

10. A thermostatic valve structure including a frame with a valve seat defining a port, a valve movably supported on said frame for controlling said port, a thermosensitive motor located at one side only of said port and having two relatively movable parts with a common axis in substantially fixed relation with respect to said frame, one of said parts being axially immovable with respect to said frame, a spring member having one end connected to the other of said parts and its other end connected to said valve whereby motion may be resiliently translated to the latter, and spring means urging said other part toward said port.

References Cited in the file of this patent

UNITED STATES PATENTS

| | | |
|---|---|---|
| 2,157,770 | Mayo | May 9, 1939 |
| 2,769,597 | Mayo | Nov. 6, 1956 |
| 2,797,873 | Woods | July 2, 1957 |
| 2,829,834 | Drapeau et al. | Apr. 8, 1958 |
| 2,830,767 | Herbenar | Apr. 15, 1958 |
| 2,981,477 | Salmon | Apr. 25, 1961 |

FOREIGN PATENTS

| | | |
|---|---|---|
| 745,481 | Great Britain | Feb. 29, 1956 |
| 1,057,826 | Germany | May 21, 1959 |